Oct. 1, 1963
F. U. VON DER SCHER
3,105,363
GAS-ELECTRIC REFRIGERATING SYSTEM
Filed Oct. 2, 1961
2 Sheets-Sheet 1
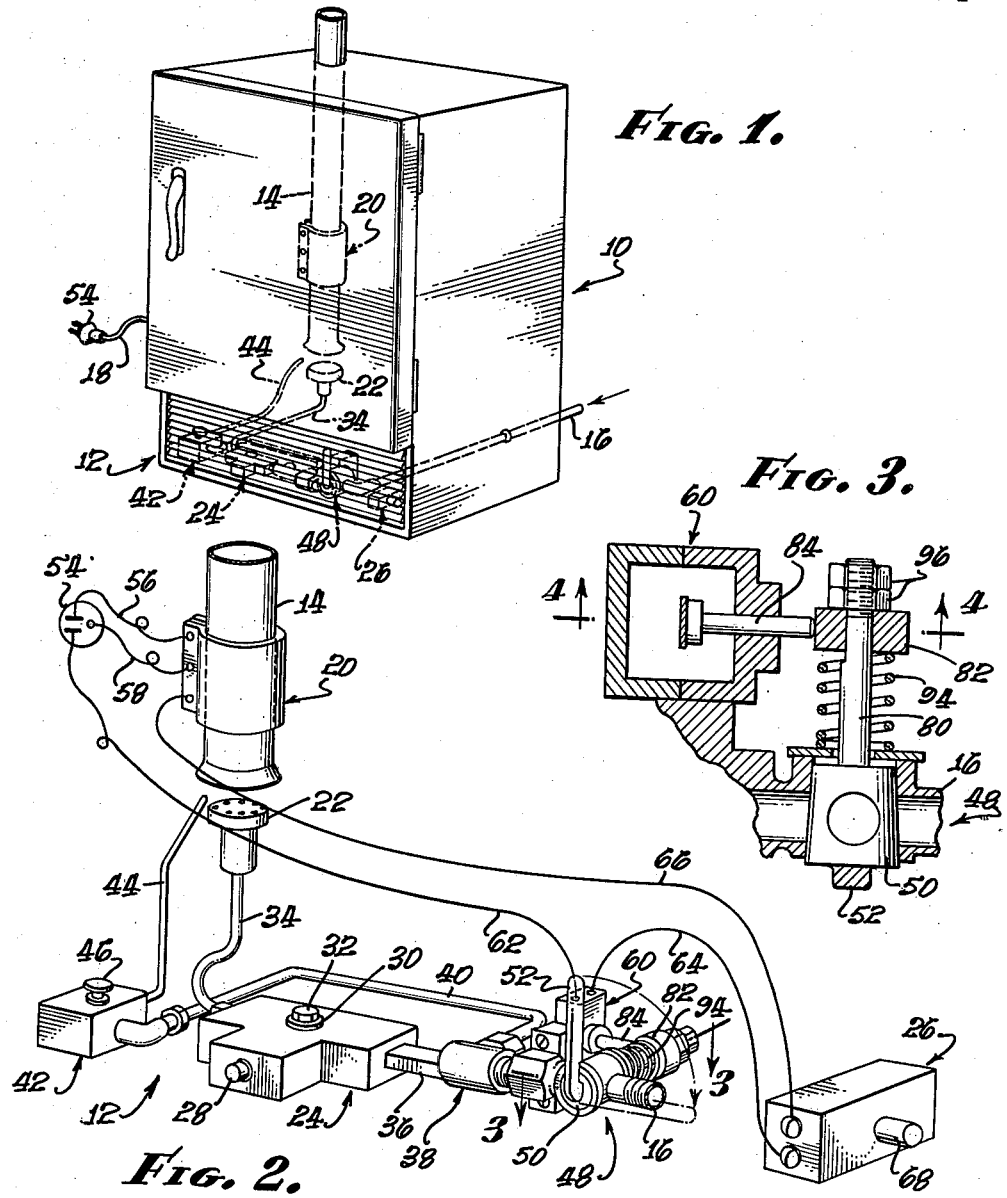
FLOYD VON DER SCHER,
INVENTOR.
BY
Bernard Kriegel
ATTORNEY.

F. LOYD VON DER SCHER,
INVENTOR.

BY
Bernard Kriegel
ATTORNEY.

3,105,363
GAS-ELECTRIC REFRIGERATING SYSTEM
Floyd U. Von Der Scher, Burbank, Calif., assignor to Norcold, Incorporated, Los Angeles, Calif., a corporation of California
Filed Oct. 2, 1961, Ser. No. 142,096
10 Claims. (Cl. 62—148)

This invention relates to refrigerating systems, and more particularly to refrigerating systems which may be operated by either gas or electricity.

Mobile installations, particularly those providing living accommodations such as house trailers and the like, impose a requirement on refrigerating systems which does not form a consideration when permanent installations are designed. This requirement is based on the fact that very often electricity is not available to power the refrigerating system. Since it is necessary that the system function at all times, a power source, which is in itself mobile, must be provided. Conventionally, this power source has been bottled gas or the like. However, when the mobile unit is in a semi-permanent installation, it is desirable to provide an alternative power source which does not require the continuous attention which is necessary when bottled gas or the like is used. The most convenient alternative power source is electricity since it is generally available at semi-permanent installations. Therefore, it has become conventional to provide alternative arrangements for supplying electrical power to the refrigerating system.

Prior art devices satisfying this requirement are in general use. However, these devices suffer from some disadvantages. One of these disadvantages is that separate controls are provided for electricity and for gas and that no interlock is provided to prevent the simultaneous application of power from both sources. Because of this independence of control, it is possible to have electricity and gas operating simultaneously. This poses an element of danger both to the environment and to the refrigerating system. A second disadvantage is that the conversion from electricity to gas and vice versa is relatively inconvenient in that certain elements of the refrigerating system must be manually inserted or removed in order to complete the conversion. For example, for gas operation a baffle must be inserted into the generator tube of the refrigerating system. On the other hand, for electrical operation, the baffle must be removed and a heating element inserted into the generator tube.

The present invention overcomes the disadvantages discussed above by providing a gas operated heating element and an electrically operated heating element, each of which may be permanently mounted adjacent the generator tube. The heating elements are constructed such that the operation of each is independent; i.e., the operation of one heating element cannot affect or injure the other element. In addition, a novel power source switching element provides a mechanical interlock such that simultaneous application of power from both sources is impossible.

It is thus an object of the present invention to provide a refrigerating system which operates alternatively on gas or electricity and which can be transferred from one power source to the other simply and efficiently.

Another object of the present invention is to provide a refrigerating system which can only operate on one power source at a given time.

Still another object of the present invention is to provide a refrigerating system having a generator tube and a permanently installed gas operated heating element, as well as an electrically operated heating element, such that either heating element may be operated without change in the installation.

A further object of the present invention is to provide a single switching element which simultaneously connects a first power source to its heating element and disconnects a second power source from its heating element.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is a perspective view of a refrigerator forming the present invention showing the location of the refrigerating unit;

FIG. 2 is a perspective view of the refrigerating unit forming a portion of the present invention;

FIG. 3 is a cross-sectional view of the switching element of the refrigerating unit taken along the line 3—3 of FIG. 2;

Figure 4:
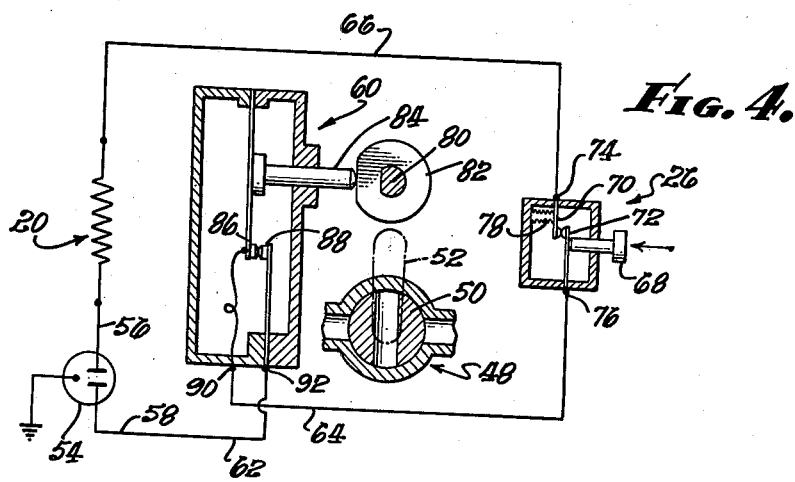
FIG. 4 is a cross-sectional view of the switching element of the refrigerating unit taken along the line 4—4 of FIG. 3 and showing a first stage in the operation of the switching element of the refrigerating unit.

Turning now to FIG. 1, there is shown a refrigerator 10, which may be mobile, and a refrigerating unit 12 contained therein. The refrigerating unit 12 includes a generator tube 14 which is constructed according to well known principles of the prior art, and which comprises a pair of concentric cylinders dividing the generator tube 14 into an inner portion and an outer portion. The inner portion encloses an air space and the outer portion carries a refrigerant, which may be heated either by applying an electric heater to the outer cylinder or by heating the enclosed air space with a gas burner. The operation of this type of refrigerator, which depends upon the vaporization of the refrigerant, is well known and will not be described herein. The refrigerating unit 12 is provided with a gas connection 16 and an electrical connection 18, either of which may be used to connect to the power sources for the refrigerator 10.

In FIG. 2, the details of construction of the refrigerating unit are shown. The generator tube 14 may be heated alternatively by an electric heating element 20 or a gas heating element 22. The electric heating element 20 is a conventional resistance heating element, which is shaped in the form of an annulus or ring such that it may be mounted on the outer surface of the generator tube 14. The gas heating element 22 is a burner which serves to heat the column of air enclosed in the inner portion of the generator tube 14. Although not shown in the figures, a baffle is inserted into the inner portion of the generator tube 14 to provide correct heat distribution within the generator tube.

The temperature of the refrigerator 10 is thermostatically controlled. When the refrigerator 10 is powered by gas, a gas thermostat 24 measures the temperature of the refrigerator 10 and controls the flow of gas to the burner 22 in accordance with that temperature. When the refrigerator 10 is electrically powered, an electrical thermostat 26 controls the flow of electric current through the electric heating element 20 in accordance with the temperature of the refrigerator 10.

The gas thermostat 24 is provided with a temperature control adjusting knob 28 which may be used to set the temperature of the refrigerator 10. An access plate 30 is held in place by a screw 32, providing necessary access to the interior of the thermostat 24 for cleaning and adjusting purposes. The thermostat 24 is connected to the burner 22 by a tube 34. Gas enters the thermostat 24 through a filter 36 which serves to prevent foreign matter from entering the burner 22. The operation of a gas thermostat is will known and will not be described herein. Gas is supplied to the filter 36 from a first output connection of a T-connection 38. A tube 40 is connected to the second output connection of the T-connection 38 and provides a parallel gas connection to a pilot lighter valve 42. The lighter valve 42 supplies gas to a burner lighter or pilot light 44 when a push button 46 is depressed. The burner 22 contains a thermostat, normally a bi-metal element (not shown), which does not permit the passage of gas from the tube 34 to the burner 22 unless the burner 22 is hot. Ignition of the burner lighter 44 serves to heat the burner 22 and opens the thermostat within the burner such that gas flow will be established to the burner.

The T-connection 38 is connected, at its input, to a gas source (not shown), which may be a conventional type of gas bottle or any other source of gas, through a switching element 48 which will be described in detail below. The switching element 48, as one of its functions, controls the passage of gas from the gas source to the burner 22 by means of a plug valve 50 which is operated by a handle 52. When the handle 52 is in the vertical position the supply of gas to the burner 22 is cut off and when the handle 52 is in the horizontal position, the gas supply is connected to the burner 22.

The electrical circuit for operating the electric heating element 20 is also shown in FIG. 2. The heating element 20, which comprises a resistance heater, is provided with three terminals. The two outside terminals are connected to the ends of the resistance heating element and the center terminal is connected to ground. An electric plug 54, adapted to engage in a conventional wall socket, has a first terminal connected to one of the outside terminals of the electric heating element 20 by a wire 56, and has a ground connection connected to the center terminal of the electric heating element 20 by a wire 58. The second terminal of the electric plug 54 is connected to a first terminal of a micro switch 60, forming a part of the switching element 48, by a wire 62. The second terminal of the micro switch 60 is connected to a first terminal of the electrical thermostat 26 by a wire 64. The second terminal of the electrical thermostat 26 is connected to the second outside terminal of the electric heating element 20 by a wire 66. Thus, an electric circuit may be completed from the power source through the electric plug 54, the micro switch 60 and the electrical thermostat 26, to the electric heating element 20.

Figure 5:
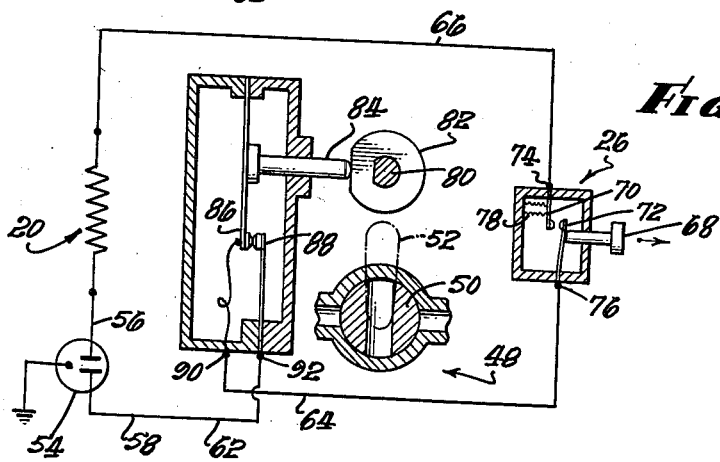
FIG. 5 is a view similar to FIG. 4, showing a second stage in the operation of the switching element.
Figure 6:
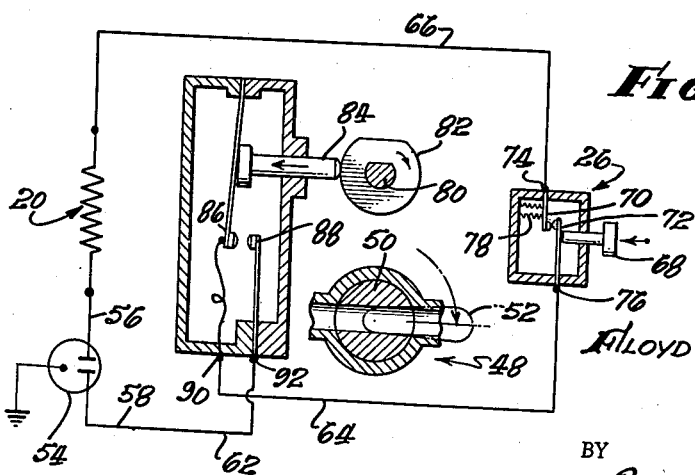
FIG. 6 is a view similar to FIG. 4, showing a third stage in the operation of the switching element.

The electrical thermostat 26 is provided with a temperature control adjusting knob 68 which regulates the operation of the electrical thermostat 26. Electrical thermostats are well known in the prior art; however, the particular thermostat shown in some detail in FIGS. 4–6 is of the type which has a pair of movable electrical contacts 70 and 72 which provide electrical continuity between a pair of terminals 74 and 76 mounted on the thermostat 26, when a desired temperature is attained. The temperature control adjusting knob 68 adjusts the linear displacement of the first electrical contact 70. An expandible bellows 78, which provides a linear displacement of the second electrical contact 72 when temperature changes occur, forms the basic operating mechanism of the thermostat 26.

The switching element 48 controls the supply of gas to the burner 22. As has already been described, a conventional plug valve 50 equipped with a handle 52 provides this control. The switching element 48 also provides control of the supply of electricity to the electric heating element 20. As has already been described, a micro switch 60 provides this control. However, the present invention requires that the switching element 48 must insure that when electrical continuity exists through the micro switch 60, the supply of gas through the plug valve 50 is completly cut off. Vice versa, when the gas supply is permitted to pass through the plug valve 50, the micro switch 60 must interrupt electrical continuity therethrough. At no time may electrical continuity through the micro switch 60 and the flow of gas through the plug valve 50 exist simultaneously.

The actuating mechanism for the switching element 48 provides the operation described above. The handle 52 which operates the plug valve 50 is mounted on a shaft 80 which extends completely through the plug valve 50 and beyond as will be described. The shaft 80 has a cam 82 fixed thereon. The cam 82 is roughly circular in cross-section, but has a flattened portion which has a diameter less than that of the circular portion. The cam 82 is positioned to engage a plunger or follower 84 adapted to actuate the micro switch 60. The micro switch 60 comprises a pair of electrical contacts 86 and 88 which are each connected to one of a pair of electrical terminals 90 and 92. The micro switch 60 provides electrical continuity between the terminals 90 and 92 when the plunger 84 is extended its maximum travel outside of the micro switch body. This continuity is interrupted when the plunger 84 is depressed. When the cam 82 has rotated to a position in which its flattened portion engages the plunger 84, the plunger is in its maximum outward position and electrical continuity is established between the terminals 90 and 92. When the cam 82 is rotated so that the circular portion of the cam engages the plunger 84, the plunger 84 is depressed and electrical continuity is interrupted.

The cam 82 is maintained in position on the shaft 80 by a spring 94 which is fitted axially on the shaft 80 such that an outward force is continually exerted on the cam 82. The shaft 80 is threaded at its end and a pair of hexagonal nuts 96 retain the cam 82 on the shaft 80 while permitting adjustment of the axial position of the cam 82.

Referring now to FIGS. 4–6, the relationship of the angular positions of the rotatable portion of the plug valve 50 and the cam 82 has a critical importance. As shown, the handle 52 is fixed on the shaft 80 such that a vertical position of the handle 52 completely closes the plug valve 50 and a horizontal position of the handle 52 completely opens the plug valve 50. The cam 82 must be so oriented on the shaft 80 that when the handle 52 is in a vertical position, that is, when the plug valve 50 is closed, the flat portion of the cam 82 engages the plunger 84. Conversely, when the handle 52 is in a horizontal position and the plug valve 50 is open, the circular portion of the cam 82 must engage the plunger 84. Thus, a vertical position of the handle 52 denotes the fact that electrical continuity exists through the micro switch 60, and that gas flow cannot occur through the plug valve 50. A horizontal position of the handle 52 denotes that gas flow exists through the plug valve 50 and that electrical continuity does not exist through the micro switch 60. Accordingly, the requirements of operation of the switching element 48 have been established.

FIGS. 4 and 5 show the handle 52 in a vertical position. Thus, electrical continuity exists through the micro switch 60. However, FIG. 4 shows that the power supply to the electric heating element 20 is further conditioned on the state of the electrical thermostat 26. In FIG. 4, the electrical thermostat is shown in a position in which electrical continuity is established, i.e., the temperature of the refrigerator 10 is above the desired temperature. An electrical circuit is thus completed through the electric heating element 20 from the electrical connection 18 through the micro switch 60 and the electrical thermostat 26. In FIG. 5, however, the electrical thermostat 26 is shown in a position in which electrical continuity does not exist therethrough, denoting a condition of the refrigerator 10 in which the temperature is as low as desired. In both FIGS. 4 and 5, it is clear that no passage of gas can occur through the plug valve 50.

FIG. 6 shows the handle 52 in a horizontal position, allowing gas flow to the burner 22. In this case, regardless of the condition of the electrical thermostat 26, no electric current can flow through the electric heating element 20 since the micro switch 60 interrupts electrical continuity. When the apparatus is in the condition shown in FIG. 6, the gas thermostat 24 performs the identical function as the electrical thermostat 26 in the condition of FIGS. 4 and 5. That is, the passage of gas through the burner 22 is only permitted when the temperature of the refrigerator 10 is above that desired.

I claim:

1. A refrigerating system of the type alternatively employing gas or electricity as power sources, in which a refrigerator is cooled by a refrigeration unit contained therein, said refrigeration unit comprising a generator tube, a gas burner heating element disposed adjacent to said generator tube for heating said generator tube, means for supplying gas to said burner heating element, a first control element coupled to said gas supply means and to said gas burner heating element and responsive to the temperature of said refrigerator for controlling the supply of gas to said burner heating element in accordance therewith, an annular electrical resistance heating element disposed around the outer surface of said generator tube for heating said generator tube, means for conducting electrical energy to said resistance heating element, a second control element coupled to said electrical energy conducting means and to said resistance heating element and responsive to the temperature of said refrigerator for controlling the supply of electrical energy to said resistance heating element in accordance therewith, and switching means connected to said gas energy supply means and to said electrical energy conducting means and adapted simultaneously to connect a first of said energy means to its associated heating element and to disconnect the second of said energy means from its associated heating element or to connect the second of said energy means to its associated heating element and disconnect the first of said energy means from its associated heating element.

2. A refrigerating system of the type alternatively employing gas or electricity as power sources, in which a refrigerator is cooled by a refrigeration unit contained therein, said refrigeration unit comprising a generator tube, a gas burner heating element disposed adjacent to said generator tube for heating said generator tube, means for supplying gas to said burner heating element, an electrical resistance heating element mounted on the outer surface of said generator tube for heating said generator tube, means for conducting electrical energy to said resistance heating element, and switching means connected to said gas supply means and to said electrical energy conducting means and adapted simultaneously to connect a first of said means to its associated heating element and to disconnect the second of said means from its associated heating element or to connect the second of said means to its associated heating element and to disconnect the first of said means from its associated heating element, in which the switching means comprises a mechanically actuated electrical switch coupled to said electrical energy conducting means and to said resistance heating element for completing and interrupting electrical continuity therethrough, a rotatable cam mechanically coupled to said electrical switch for actuating said switch to complete electrical continuity therethrough at first particular angular orientations of said rotatable cam and to interrupt electrical continuity at other orientations of said rotatable cam, a valve having a rotatable plug with a passage therethrough, said valve coupled to said gas supply means and to said gas burner heating element for permitting the flow of gas through said valve at second particular angular orientations of said rotatable plug and for obstructing the flow of gas through said valve at other orientations of said rotatable plug, means for simultaneously rotating said rotatable cam and said rotatable plug, said rotatable cam and said rotatable plug being disposed such that a fixed angular difference is maintained between said first and second particular angular orientations.

3. A refrigerating system of the type alternatively employing gas or electricity as power sources, in which a refrigerator is cooled by a refrigeration unit contained therein, said refrigeration unit comprising a generator tube, a gas burner heating element disposed adjacent to said generator tube for heating said generator tube, means for supplying gas to said burner heating element, an electrical resistance heating element mounted on the outer surface of said generator tube for heating said generator tube, means for conducting electrical energy to said resistance heating element, and switching means connected to said gas supply means and to said electrical energy conducting means and adapted simultaneously to connect a first of said means to its associated heating element and to disconnect the second of said means from its associated heating element or to connect the second of said means to its associated heating element and to disconnect the first of said means from its associated heating element, in which the switching means comprises a mechanically actuated electrical switch coupled to said electrical energy conducting means and to said resistance heating element for completing and interrupting electrical continuity therethrough, a rotatable shaft, a cam mounted on said shaft and rotatable therewith, said cam being mechanically coupled to said electrical switch for actuating said switch to complete electrical continuity therethrough at first particular angular orientations of said rotatable cam and to interrupt electrical continuity at other orientations of said rotatable cam, a valve having a rotatable plug with a passage therethrough, said valve coupled to said gas supply means and to said gas burner heating element for permitting the flow of gas through said valve at second particular angular orientations of said rotatable plug and for obstructing the flow of gas through said valve at other orientations of said rotatable plug, said plug mounted on said shaft and rotatable therewith, said cam and said plug being mounted on said shaft such that said first and second particular orientations occur at different angular positions of said shaft.

4. A refrigerating system of the type alternatively employing gas or electricity as power sources, in which a refrigerator is cooled by a refrigeration unit contained therein, said refrigeration unit comprising a generator tube, a gas burner heating element disposed adjacent to said generator tube for heating said generator tube, means for supplying gas to said burner heating element, a first control element coupled to said gas supply means and to said gas burner heating element and responsive to the temperature of said refrigerator for controlling the supply of gas to said burner heating element in accordance therewith, an annular electrical resistance heating element mounted on the outer surface of said generator tube for heating said generator tube, means for conducting electrical energy to said resistance heating element, a second control element coupled to said electrical energy conducting means and to said resistance heating element and responsive to the temperature of said refrigerator for controlling the supply of electrical energy to said resistance heating element in accordance therewith, and switching means connected to said gas energy supply means and to said electrical energy conducting means and adapted simultaneously to connect a first of said energy means to its associated heating element and to disconnect the sec-ond of said energy means from its associated heating element or to connect the second of said energy means to its associated heating element and disconnect the first of said energy means from its associated heating element, in which the switching means comprises a mechanically actuated electrical switch coupled to said electrical energy conducting means and to said resistance heating element for completing and interrupting electrical continuity therethrough, a rotatable cam mechanically coupled to said electrical switch for actuating said switch to complete electrical continuity therethrough at first particular angular orientations of said rotatable cam and to interrupt electrical continuity at other orientations of said rotatable cam, a valve having a rotatable plug with a passage therethrough, said valve coupled to said gas supply means and to said gas burner heating element for permitting the flow of gas through said valve at second particular angular orientations of said rotatable plug and for obstructing the flow of gas through said valve at other orientations of said rotatable plug, means for simultaneously rotating said rotatable cam and said rotatable plug, said rotatable cam and said rotatable plug being disposed such that a fixed angular difference in maintained between said first and second particular angular orientations.

5. A refrigerating system of the type alternatively employing gas or electricity as power sources, in which a refrigerator is cooled by a refrigeration unit contained therein, said refrigeration unit comprising a generator tube, a gas burner heating element disposed adjacent to said generator tube for heating said generator tube, means for supplying gas to said burner heating element, a first control element coupled to said gas supply means and to said gas burner heating element and responsive to the temperature of said refrigerator for controlling the supply of gas to said burner heating element in accordance therewith, an annular electrical resistance heating element mounted on the outer surface of said generator tube for heating said generator tube, means for conducting electrical energy to said resistance heating element, a second control element coupled to said electrical energy conducting means and to said resistance heating element and responsive to the temperature of said refrigerator for controlling the supply of electrical energy to said resistance heating element in accordance therewith, and switching means connected to said gas energy supply means and to said electrical energy conducting means and adapted simultaneously to connect a first of said energy means to its associated heating element and to disconnect the second of said energy means from its associated heating element or to connect the second of said energy means to its associated heating element and disconnect the first of said energy means from its associated heating element, in which the switching means comprises a mechanically actuated electrical switch coupled to said electrical energy conducting means and to said resistance heating element for completing and interrupting electrical continuity therethrough, a rotatable shaft, a cam mounted on said shaft and rotatable therewith, said cam being mechanically coupled to said electrical switch for actuating said switch to complete electrical continuity therethrough at first particular angular orientations of said rotatable cam and to interrupt electrical continuity at other orientations of said rotatable cam, a valve having a rotatable plug with a passage therethrough, said valve coupled to said gas supply means and to said gas burner heating element for permitting the flow of gas through said valve at second particular angular orientations of said rotatable plug and for obstructing the flow of gas through said valve at other orientations of said rotatable plug, said plug mounted on said shaft and rotatable therewith, said cam and said plug being mounted on said shaft such that said first and second particular orientations occur at different angular positions of said shaft.

6. A refrigerating system of the type alternatively employing gas or electricity as power sources, in which a refrigerator is cooled by a refrigeration unit contained therein, said refrigeration unit comprising a generator tube, a gas burner heating means disposed adjacent to said generator tube for heating said generator tube, means for supplying gas to said burner heating means, a first control element coupled to said gas supply means and to said gas burner heating means and responsive to the temperature of said refrigerator for controlling the supply of gas to said burner heating means in accordance therewith, electrical heating means for heating said generator tube, means for conducting electrical energy to said electrical heating means, a second control element coupled to said electrical energy conducting means and to said electrical heating means and responsive to the temperature of said refrigerator for controlling the supply of electrical energy to said electrical heating means in accordance therewith, and switching means connected to said gas energy supply means and to said electrical energy conducting means and adapted simultaneously to connect a first of said energy means to its associated heating means and to disconnect the second of said energy means from its associated heating means or to connect the second of said energy means to its associated heating means and disconnect the first of said energy means from its associated heating means.

7. A refrigerating system of the type alternatively employing gas or electricity as power sources, in which a refrigerator is cooled by a refrigeration unit contained therein, said refrigeration unit comprising a generator tube, a gas burner heating element disposed adjacent to said generator tube for heating said generator tube, means for supplying gas to said burner heating element, an annular electrical resistance heating element disposed around the outer surface of said generator tube for heating said generator tube, means for conducting electrical energy to said resistance heating element, control means responsive to the temperature of said refrigerator for controlling the supply of gas to said burner heating element or the supply of electrical energy to said resistance heating element, and switching means connected to said gas energy supply means and to said electrical energy conducting means and adapted simultaneously to connect a first of said energy means to its associated heating element and to disconnect the second of said energy means from its associated heating element or to connect the second of said energy means to its associated heating element and disconnect the first of said energy means from its associated heating element.

8. A refrigerating system of the type alternatively employing gas or electricity as power sources, in which a refrigerator is cooled by a refrigeration unit contained therein, said refrigeration unit comprising a generator tube, a gas burner heating means disposed adjacent to said generator tube for heating said generator tube, means for supplying gas to said burner heating element, electrical heating means for heating said generator tube, means for conducting electrical energy to said electrical heating means, control means responsive to the temperature of said refrigerator for controlling the supply of gas to said burner heating means or the supply of electrical energy to said electrical heating means, and switching means connected to said gas energy supply means and to said electrical energy conducting means and adapted simultaneously to connect a first of said energy means to its associated heating means and to disconnect the second of said energy means from its associated heating means or to connect the second of said energy means to its associated heating means and disconnect the first of said energy means from its associated heating means.

9. A refrigerating system of the type alternatively employing gas or electricity as power sources, in which a refrigerator is cooled by a refrigeration unit contained therein, said refrigeration unit comprising a generator tube, a gas burner heating element disposed adjacent to said generator tube for heating said generator tube, means for supplying gas to said burner heating element including a valve having a valve element movable to positions opening and closing the supply of gas to said burner heating element, electrical heating means for heating said generator tube, means for conducting electrical energy to said electrical heating means, control means responsive to the temperature of said refrigerator for controlling the supply of gas to said burner heating means or the supply of electrical energy to said electrical heating means, and switch means operatively connected to and shiftable by said movable valve element and connected to said electrical energy conducting means, said valve element opening said switch means upon shifting of said valve element to a position opening said valve to prevent flow of electrical energy to said electrical heating means, said valve element closing said switch means upon shifting of said valve element to a position closing said valve to allow flow of electrical energy to said electrical heating means.

10. A refrigerating system of the type alternatively employing gas or electricity as power sources, in which a refrigerator is cooled by a refrigeration unit contained therein, said refrigeration unit comprising a generator tube, a gas burner heating means disposed adjacent to said generator tube for heating said generator tube, means for supplying gas to said burner heating element, electrical heating means for heating said generator tube, means for conducting electrical energy to said electrical heating means, control means responsive to the temperature of said refrigerator for controlling the supply of gas to said burner heating means or the supply of electrical energy to said electrical heating means, and switching means connected to said gas energy supply means and to said electrical energy conducting means and adapted simultaneously to connect a first of said energy means to its associated heating means and to disconnect the second of said energy means from its associated heating means or to connect the second of said energy means to its associated heating means and disconnect the first of said energy means from its associated heating means, in which the switching means comprises a mechanically actuated electrical switch coupled to said electrical energy conducting means and to said electrical heating means for completing and interrupting electrical conductivity therethrough, said gas supply means including a valve having a rotatable plug with a passage therethrough, and means coupling said rotatable plug to said switch, whereby said plug opens said switch upon turning of said plug to a position opening said valve and said plug closes said switch upon turning of said plug to a position closing said valve.

References Cited in the file of this patent
UNITED STATES PATENTS

| | | |
|---|---|---|
| 1,729,355 | Munters | Sept. 24, 1929 |
| 2,009,067 | Mulholland | July 23, 1935 |
| 2,863,298 | Hellstrom | Dec. 9, 1958 |
| 2,921,176 | Scofield | Jan. 12, 1960 |
| 2,960,846 | Kogel | Nov. 22, 1960 |
| 3,080,729 | Grubb | Mar. 12, 1963 |